(12) United States Patent
Zhao (10) Patent No.: US 10,921,195 B2
(45) Date of Patent: Feb. 16, 2021

(54) TEMPERATURE SENSOR AND TEMPERATURE DETECTION METHOD

(71) Applicant: BOE TECHNOLOGY GROUP CO., LTD., Beijing (CN)

(72) Inventor: Lijun Zhao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 298 days.

(21) Appl. No.: 16/028,563

(22) Filed: Jul. 6, 2018

(65) Prior Publication Data
US 2019/0025131 A1 Jan. 24, 2019

(30) Foreign Application Priority Data
Jul. 20, 2017 (CN) .......................... 2017 1 0595936

(51) Int. Cl.
*G01K 7/01* (2006.01)
(52) U.S. Cl.
CPC ..................... *G01K 7/01* (2013.01)
(58) Field of Classification Search
CPC ................. G01K 7/01; G01K 7/015
See application file for complete search history.

(56) References Cited

U.S. PATENT DOCUMENTS

| | | | |
|---|---|---|---|
| 5,388,134 A * | 2/1995 | Douglass | G01K 1/028 374/102 |
| 5,914,629 A | 6/1999 | Maki | |
| 7,557,665 B2 * | 7/2009 | Chung | G11C 7/04 331/143 |
| 8,742,815 B2 * | 6/2014 | Wadhwa | H03K 5/133 327/262 |
| 9,672,762 B2 * | 6/2017 | Wang | G09G 3/3648 |
| 9,891,116 B2 * | 2/2018 | Obayashi | G01K 7/01 |

(Continued)

FOREIGN PATENT DOCUMENTS

| | | |
|---|---|---|
| CN | 102956201 A | 3/2013 |
| CN | 104064146 A | 9/2014 |
| CN | 106840432 A | 6/2017 |

OTHER PUBLICATIONS

First Office Action for Chinese Application No. 201710595936.7, dated Dec. 19, 2018, 10 pages.

*Primary Examiner* — Nathaniel T Woodward
*Assistant Examiner* — Philip L Cotey
(74) *Attorney, Agent, or Firm* — Brooks Kushman P.C.

(57) ABSTRACT

A temperature sensor and a temperature detection method are provided. The temperature sensor includes an oscillation circuitry, a switch circuitry, a first charge-discharge circuitry, a sensing transistor, a second charge-discharge circuitry and a compensation control circuitry. The compensation control circuitry is coupled to a second end of the second charge-discharge circuitry, an adjustment voltage input end and a first control signal input end, and configured to: control the adjustment voltage input end to be decoupled with the second end of the second charge-discharge circuitry under a control of the first control signal input end in a charging period of a temperature detection stage; control the adjustment voltage input end to be coupled to the second end of the second charge-discharge circuitry under the control of the first control signal input end in a discharging period of the temperature detection stage.

15 Claims, 4 Drawing Sheets

(56) References Cited

U.S. PATENT DOCUMENTS

| | | | |
|---|---|---|---|
| 2006/0066384 A1 | 3/2006 | Jain et al. | |
| 2007/0081575 A1* | 4/2007 | Liu | G01K 7/203 |
| | | | 374/111 |
| 2007/0195856 A1* | 8/2007 | Blom | G01K 7/01 |
| | | | 374/117 |
| 2008/0143449 A1* | 6/2008 | Chung | G01K 7/01 |
| | | | 331/66 |
| 2008/0224785 A1* | 9/2008 | Chung | G11C 11/406 |
| | | | 331/66 |
| 2009/0231044 A1* | 9/2009 | Iwaida | H03L 7/099 |
| | | | 331/10 |
| 2010/0111137 A1* | 5/2010 | Chen | G01K 7/01 |
| | | | 374/178 |
| 2014/0086279 A1* | 3/2014 | Cao | G01K 7/01 |
| | | | 374/183 |
| 2015/0063403 A1* | 3/2015 | Cho | G01K 15/005 |
| | | | 374/1 |
| 2015/0300890 A1* | 10/2015 | Lin | G01K 7/01 |
| | | | 702/130 |
| 2015/0355033 A1* | 12/2015 | Zhang | G01K 13/00 |
| | | | 374/170 |
| 2015/0371586 A1* | 12/2015 | Chen | G09G 3/3233 |
| | | | 345/78 |
| 2016/0344220 A1* | 11/2016 | Liu | G09G 3/3648 |

\* cited by examiner

TEMPERATURE SENSOR AND TEMPERATURE DETECTION METHOD

CROSS-REFERENCE TO RELATED APPLICATION

This application claims priority to Chinese Patent Application No. 201710595936.7 filed on Jul. 20, 2017, which is incorporated herein by reference in its entirety.

TECHNICAL FIELD

The present disclosure relates to the field of sensor technology, in particular to a temperature sensor and a temperature detection method.

BACKGROUND

A temperature sensor is a sensor that senses temperature and outputs the sensed temperature in the form of signal. The specific working principle of the temperature sensor is that the sensing transistor in the temperature sensor generates different current signals in response to different temperatures. The current signal controls the signal output of the temperature sensor by controlling the charging and discharging rate of the charge-discharge circuitry in the temperature sensor. The temperature sensed by the temperature sensor is then determined by detecting the frequency of the output signal.

However, in the forming process of the temperature sensor, due to the manufacturing process and environmental factors, the sensing transistor of the temperature sensor may cause the threshold voltage to shift, and the threshold voltage shift will affect the frequency of the output signal of the temperature sensor, resulting in an inaccurate temperature measurement result.

SUMMARY

A temperature sensor is provided in the present disclosure, including: an oscillation circuitry, coupled to a first node and a signal output end, and configured to control the signal output end to output an oscillation signal under a control of the first node; a switch circuitry, coupled to a power signal input end, the first node and the signal output end, and configured to control the power signal input end to be coupled to or decoupled with the first node under a control of the signal output end; a first charge-discharge circuitry, coupled to the first node and a low-level signal input end, configured to charge or discharge under the control of the first node; a sensing transistor, where a first electrode of the sensing transistor is coupled to the first node, a second electrode of the sensing transistor is coupled to the low-level signal input end, and a gate of the sensing transistor is coupled to a data signal input end; a second charge-discharge circuitry, where a first end of the second charge-discharge circuitry is coupled to the first node; and a compensation control circuitry, coupled to a second end of the second charge-discharge circuitry, an adjustment voltage input end and a first control signal input end, and configured to: control the adjustment voltage input end to be decoupled with the second end of the second charge-discharge circuitry under a control of the first control signal input end in a charging period of a temperature detection stage; control the adjustment voltage input end to be coupled to the second end of the second charge-discharge circuitry under the control of the first control signal input end in a discharging period of the temperature detection stage.

Optionally, the temperature sensor further includes a sensing control circuitry, where the gate of the sensing transistor is coupled to the data signal input end through the sensing control circuitry; the sensing control circuitry is coupled to a second control signal input end, and configured to: control the data signal input end to be decoupled with the gate of the sensing transistor under a control of the second control signal input end in the charging period of the temperature detection stage; control the data signal input end to be coupled with the gate of the sensing transistor under the control of the second control signal input end in the discharging period of the temperature detection stage.

Optionally, the sensing control circuitry is further configured to control the data signal input end to be decoupled with the gate of the sensing transistor under the control of the second control signal input end in a preparation period and a holding period of a non-temperature detection stage; the compensation control circuitry is further configured to: control the adjustment voltage input end to be decoupled with the second end of the second charge-discharge circuitry under the control of the first control signal input end in the preparation period of the non-temperature detection stage; control the adjustment voltage input end to be coupled with the second end of the second charge-discharge circuitry under the control of the first control signal input end in the holding period of the non-temperature detection stage.

Optionally, the oscillation circuitry includes an odd number of inverters connected in series, and an input end of a first one of the inverters is coupled to the first node, and an output end of a last one of the inverters is coupled to the signal output end.

Optionally, the switch circuitry includes a first switch transistor, a gate of the first switch transistor is coupled to the signal output end, a first electrode of the first switch transistor is coupled to the power signal input end, and a second electrode of the first switch transistor is coupled to the first node.

Optionally, the sensing control circuitry includes a second switch transistor, a first electrode of the second switch transistor is coupled to the data signal input end, a second electrode of the second switch transistor is coupled to the gate of the sensing transistor, and a gate of the second switch transistor is coupled to the second control signal input end.

Optionally, the compensation control circuitry includes a third switch transistor, a gate of the third switch transistor is coupled to the first control signal input end, a first electrode of the third switch transistor is coupled to the adjustment voltage input end, and a second electrode of the third switch transistor is coupled to the second end of the second charge-discharge circuitry.

A temperature detection method is further provided in the present disclosure, applied to the above temperature sensor, where the method includes: in a charging period in at least one detection period of a temperature detection stage, under a control of the first node, controlling, by the oscillation circuitry, the signal output end to output a high-level oscillation signal; applying a power voltage to the power signal input end; under a control of the signal output end, controlling, by the switch circuitry, the power signal input end to be coupled to the first node, to enable a level of the first node to be the power voltage to charge the first charge-discharge circuitry; in a discharging period in at least one detection period of the temperature detection stage, under the control of the first node, controlling, by the oscillation circuitry, the signal output end to output a low-level oscillation signal;

under the control of the signal output end, controlling, by the switch circuitry, the power signal input end to be decoupled with the first node; applying a first adjustment voltage to the adjustment voltage input end; under a control of the first control signal input end, controlling, by the compensation control circuitry, the adjustment voltage input end to be coupled to the second end of the second charge-discharge circuitry, to enable a level of the second end of the second charge-discharge circuitry to be the first adjustment voltage, where under a bootstrap action of the second charge-discharge circuitry, the level of the first node is changed from the power voltage to a sum of the power voltage and the first adjustment voltage, and the first adjustment voltage is equal to a threshold voltage of the sensing transistor; applying a data voltage to the data signal input end, to enable a level of the gate of the sensing transistor to be the data voltage to turn on the sensing transistor, and enable the first charge-discharge circuitry to discharge through the sensing transistor.

Optionally, in the case that the temperature sensor includes the sensing control circuitry, the sensing control circuitry controls the data signal input end to be decoupled with the gate of the sensing transistor under a control of the second control signal input end in the charging period in at least one detection period of the temperature detection stage, and the sensing control circuitry controls the data signal input end to be coupled to the gate of the sensing transistor under the control of the second control signal input end in the discharging period in at least one detection period of the temperature detection stage, to enable the level of the gate of the sensing transistor to be the data voltage.

Optionally, the temperature detection method further includes: in the preparation period of the non-temperature detection stage, under the control of the first node, controlling, by the oscillation circuitry, the signal output end to output a high-level oscillation signal; applying a power voltage to the power signal input end; under a control of the signal output end, controlling, by the switch circuitry, the power signal input end to be coupled to the first node, to enable a level of the first node to be the power voltage to charge the first charge-discharge circuitry; in the holding period of the non-temperature detection stage, under a control of the first control signal input end, controlling, by the sensing control circuitry, the data signal input end to be decoupled with the gate of the sensing transistor to turn off the sensing transistor; applying a second adjustment voltage to the adjustment voltage input end, where the second adjustment voltage is a negative voltage; under the control of the first control signal input end, controlling, by the compensation control circuitry, the adjustment voltage input end to be coupled to the second end of the second charge-discharge circuitry, to enable a level of the second end of the second charge-discharge circuitry to be the second adjustment voltage, where under a bootstrap action of the second charge-discharge circuitry, the level of the first node is changed from the power voltage to a sum of the power voltage and the second adjustment voltage; and under the control of the first node, controlling, by the oscillation circuitry, the signal output end to stop outputting.

BRIEF DESCRIPTION OF THE DRAWINGS

The present disclosure will be described hereinafter in conjunction with the drawings. The following drawings are for illustrative purposes only, but shall not be used to limit the scope of the present disclosure.

DETAILED DESCRIPTION

In order to further describe the temperature sensor and the temperature detection method in the embodiments of the present disclosure, the temperature sensor and the temperature detection method will be described in detail in conjunction with the drawings.

Figure 1:
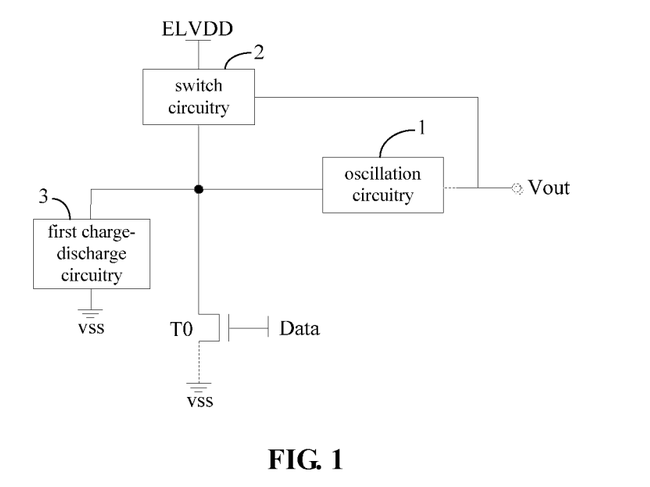
FIG. 1 is a schematic view of a temperature sensor in the related art.
Figure 2:
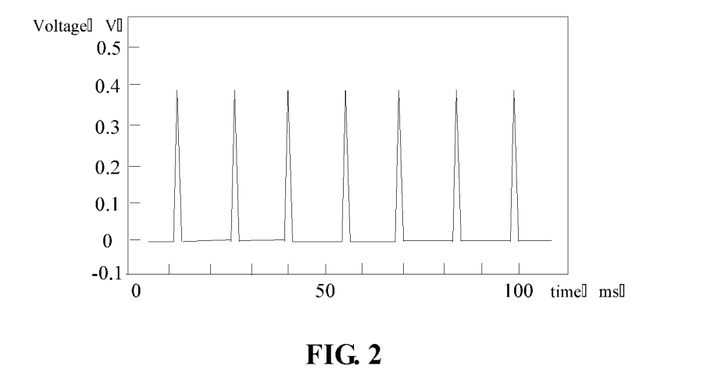
FIG. 2 is a schematic view of an oscillation signal output by an oscillation circuitry in some embodiments of the present disclosure.
Figure 3:
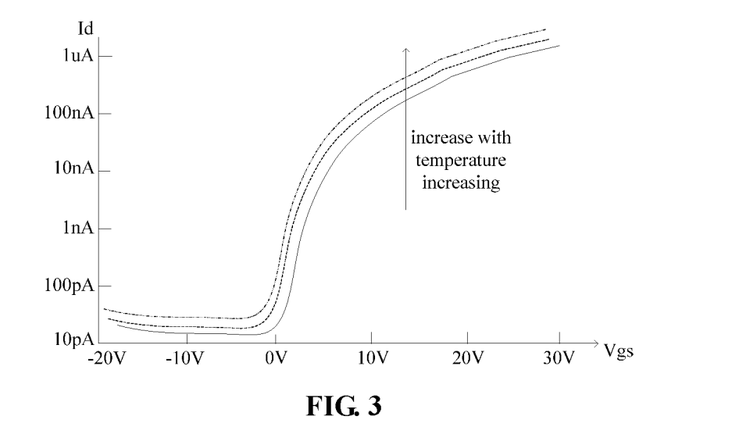
FIG. 3 is a schematic view of a leakage current of a sensing transistor as a function of temperature in some embodiments of the present disclosure.

As shown in FIG. 1, the temperature sensor in the related art generally includes an oscillation circuitry 1, a switch circuitry 2, a first charge-discharge circuitry 3 and a sensing transistor T0. When the temperature sensor actually detects the temperature, the sensing transistor T0 generates a corresponding leakage current in accordance with the environment to be detected. The value of the leakage current affects the charging/discharging rate of the first charging-discharging circuitry 3, and the charging/discharging rate of the first charging-discharging circuitry 3 affects the oscillation frequency of the oscillation signal output by the oscillation circuitry 1. The oscillation frequency of the oscillation signal (see FIG. 2) determines the current ambient temperature to be detected. Specifically, as shown in FIG. 3, according to the temperature characteristics of the sensing transistor T0, when the temperature changes, the leakage current generated by the sensing transistor T0 may change accordingly and the leakage current may change regularly with the temperature. It can be seen from FIG. 3 that, as the temperature increases, the leakage current generated by the sense transistor T0 increases.

Figure 4:
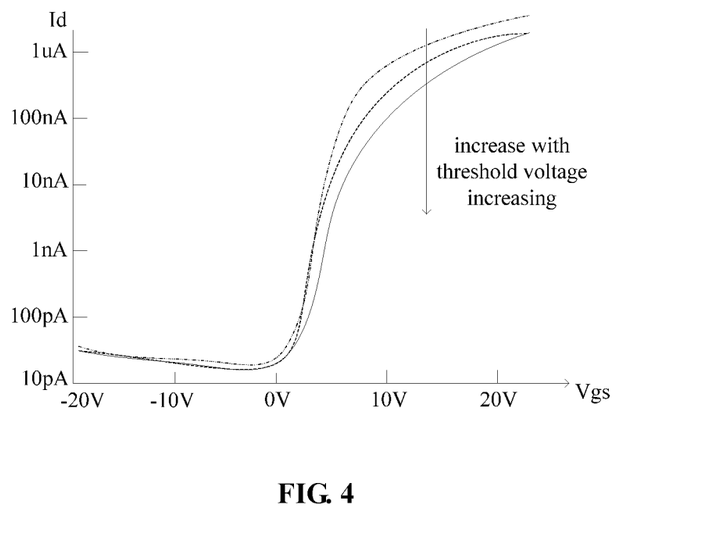
FIG. 4 is a schematic view of a leakage current of a sensing transistor as a function of a threshold voltage in some embodiments of the present disclosure.

However, in the process of manufacturing the temperature sensor, due to manufacturing processes and environmental factors, the threshold voltage of the sense transistor T0 of the temperature sensor may be shifted, and then the leakage current Id of the sensing transistor T0 may be shifted accordingly. As a result, the charging/discharging rate of the first charge-discharge circuitry 3 may be affected, thereby affecting the frequency of the oscillating signal output by the oscillating circuitry 1, resulting in an inaccurate temperature measurement results. Specifically, referring to FIG. 4, as the threshold voltage of the sensing transistor T0 increases, the leakage current Id generated by the sensing transistor T0 decreases, and the curve shifts to the right side.

In view of this, it is found that the second charge-discharge circuitry 4 and the compensation control circuitry 5 can be introduced into the temperature sensor so as to change the level of the first electrode of the sensing transistor T0 and enable the leakage current Id generated by the transistor T0 not to be affected by its own threshold voltage, thereby solving the problem that the temperature sensor cannot accurately measure the temperature.

Figure 5:
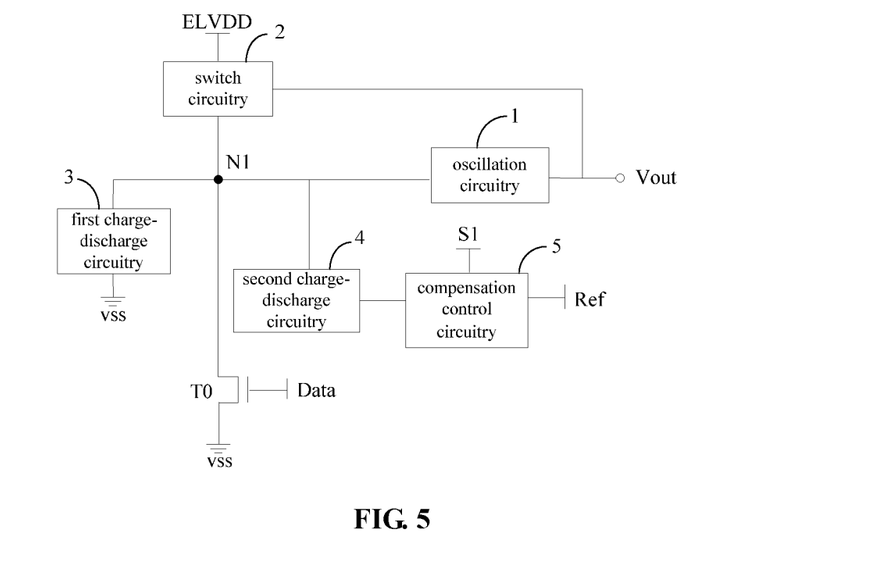
FIG. 5 is a schematic view of a temperature sensor in some embodiments of the present disclosure.

Specifically, referring to FIG. 5, a temperature sensor in some embodiments of the present disclosure includes an oscillation circuitry 1, a switch circuitry 2, a first charge-discharge circuitry 3, a sensing transistor T0, a second charge-discharge circuitry 4, and a compensation control circuitry 5.

Specifically, the oscillation circuitry 1 is coupled to a first node N1 and a signal output end Vout, and configured to control the signal output end Vout to output an oscillation signal under a control of the first node N1. The switch circuitry 2 is coupled to a power signal input end ELVDD, the first node N1 and the signal output end Vout, and configured to control the power signal input end ELVDD to be coupled to or decoupled with the first node N1 under a control of the signal output end Vout. The first charge-discharge circuitry 3 is coupled to the first node N1 and a low-level signal input end VSS, configured to charge or discharge under the control of the first node N1. A first electrode of the sensing transistor T0 is coupled to the first node N1, a second electrode of the sensing transistor T0 is coupled to the low-level signal input end VSS, and a gate of the sensing transistor T0 is coupled to a data signal input end Data. A first end of the second charge-discharge circuitry 4 is coupled to the first node N1. The compensation control circuitry 5 is coupled to a second end of the second charge-discharge circuitry 4, an adjustment voltage input end Ref and a first control signal input end S1, and configured to: control the adjustment voltage input end Ref to be decoupled with the second end of the second charge-discharge circuitry 4 under a control of the first control signal input end S1 in a charging period P1 of a temperature detection stage; control the adjustment voltage input end Ref to be coupled to the second end of the second charge-discharge circuitry 4 under the control of the first control signal input end S1 in a discharging period P2 of the temperature detection stage.

Figure 8:
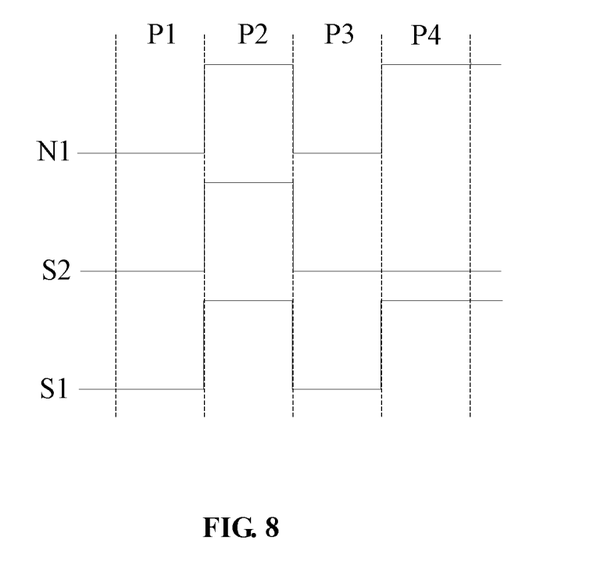
FIG. 8 is an operation timing diagram of a temperature sensor in some embodiments of the present disclosure.

As shown in FIG. 8, in a charging period P1 in at least one detection period of a temperature detection stage, the oscillation circuitry 1 controls the signal output end Vout to output a high-level oscillation signal under a control of the first node N1. A power voltage Vdd is applied to the power signal input end ELVDD. The switch circuitry 2 controls, under a control of the high-level oscillation signal output by signal output end Vout, the power signal input end ELVDD to be coupled to the first node N1, to enable a level of the first node N1 to be the power voltage Vdd to charge the first charge-discharge circuitry 3. The compensation control circuitry 5 controls the adjustment voltage input end Ref to be decoupled with the second end of the second charge-discharge circuitry 4 under a control of the first control signal input end S1. Under a control of the data signal input end Data, the sensing transistor T0 is turned off.

In a discharging period P2 in at least one detection period of the temperature detection stage, the oscillation circuitry 1 controls the signal output end Vout to output a low-level oscillation signal under the control of the first node N1 (the current level of the first node N1 is Vdd). The switch circuitry 2 controls the power signal input end ELVDD to be decoupled with the first node N1, under the control of the low-level oscillation signal output by the signal output end Vout. A first adjustment voltage Vc is applied to the adjustment voltage input end Ref. Under a control of the first control signal input end S1, the compensation control circuitry controls the adjustment voltage input end Ref to be coupled to the second end of the second charge-discharge circuitry 4, to enable a level of the second end of the second charge-discharge circuitry 4 to be Vc. Under a bootstrap action of the second charge-discharge circuitry 4, the level of the first node N1 is changed from Vdd to Vdd+Vc, and Vc is equal to a threshold voltage Vth of the sensing transistor T0. A data voltage Vdata is applied to the data signal input end Data, to enable a level of the gate of the sensing transistor T0 to be Vdata to turn on the sensing transistor T0, and enable the first charge-discharge circuitry 3 to discharge through the sensing transistor T0.

It should be noted that the level value of the signal applied to the data signal input end Data needs to be matched with the working process of the actual working period, so as to realize the control of the sensing transistor T0 and meet the requirement of the normal operation of the temperature sensor.

According to the temperature sensor in some embodiments of the present disclosure, in a charging period P1, the level of the first node N1 may reach the power voltage Vdd, to charge the first charge-discharge circuitry 3. In a discharging period P2, the compensation control circuitry controls the adjustment voltage input end Ref to be coupled to the second end of the second charge-discharge circuitry 4, to enable a level of the second end of the second charge-discharge circuitry 4 to be Vc. Under a bootstrap action of the second charge-discharge circuitry 4, the level of the first node N1 is changed from Vdd to Vdd+Vc, and Vc is equal to a threshold voltage Vth of the sensing transistor T0. Under the control of the data signal input end Data, the level of the gate of the sensing transistor T0 becomes Vdd to turn on the sensing transistor T0, and then the first charge-discharge circuitry 3 may discharge through the sensing transistor T0.

According to the above analysis, in the discharging period P2, when the sensing transistor T0 is turned on, the source-gate voltage Vsg of the sensing transistor T0 becomes (Vdd+Vth−Vdata), and the drain current Id generated by the sensing transistor T0 is: $Id=k(Vsg-Vth)^2$ Equation (1), where k is a constant.

Substituting Vsg=(Vdd+Vth−Vdata) into Equation (1), and then $Id=k(Vdd+Vth-Vdata-Vth)^2=k(Vdd-Vdata)^2$ Equation (2).

It can be known from Equation (2) that, the leakage current Id is only related to the data voltage Vdata and the power supply voltage Vdd, but it is not related to the threshold voltage Vth of the sensing transistor T0. Therefore, in the manufacturing process of the temperature sensor, even if the threshold voltage of the sensing transistor T0 of the temperature sensor is shifted due to the manufacturing process and the environment, the leakage current Id generated when the sensing transistor T0 operates in the saturation state may not be affected, therefore the frequency of the signal output by the temperature sensor may not be affected by the threshold voltage Vth of the sensing transistor T0, thereby ensuring the accuracy of the temperature measurement result.

Figure 6:
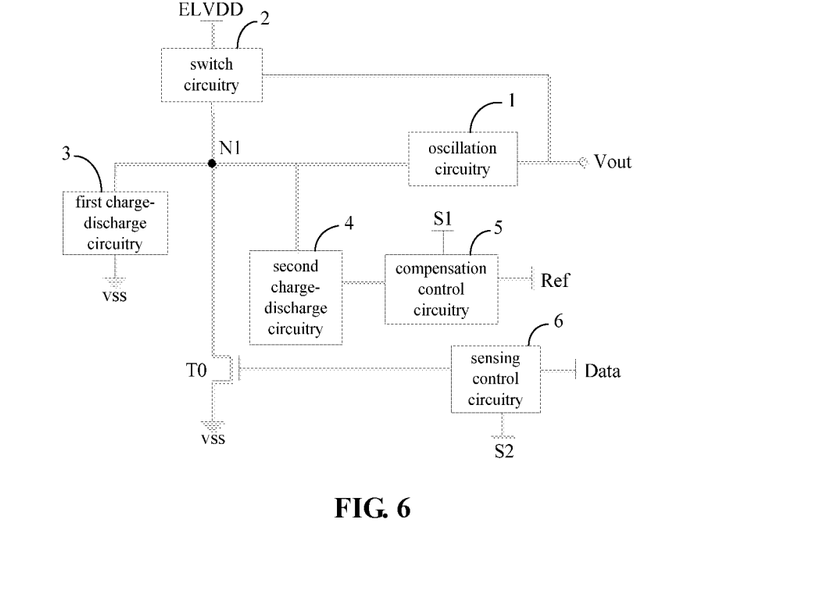
FIG. 6 is a schematic view of a temperature sensor in some embodiments of the present disclosure.

Referring to FIG. 6, in order to better control the turn-on and turn-off of the sensing transistor T0, in some embodiments of the present disclosure, the temperature sensor further includes a sensing control circuitry 6. The gate of the sensing transistor T0 is coupled to the data signal input end Data through the sensing control circuitry 6. The sensing control circuitry 6 is coupled to the sensing transistor T0, the second control signal input end S2 and the data signal input end Data. The sensing control circuitry 6 is configured to: control the data signal input end Data to be decoupled with the gate of the sensing transistor T0 under a control of the second control signal input end S2 in the charging period P1 of the temperature detection stage, and control the data signal input end Data to be coupled with the gate of the sensing transistor T0 under the control of the second control signal input end S2 in the discharging period P2 of the temperature detection stage.

The sensing control circuitry 6 introduced in the temperature sensor may control the connection of the data signal input end Data and the sensing transistor T0, so as to control whether the sensing transistor T0 is turned on, so that the signal provided by the data signal input end Data is not needed to be changed between high and low levels at different time periods. For example, a DC data signal may be input to the data signal input end Data directly. When the sensing transistor T0 is controlled to be turned off, the sensing control circuitry 6 may control the data signal input end Data to be decoupled with the gate of the sensing transistor T0, thereby better controlling the sensing transistor T0.

In practical applications, the temperature sensor in some embodiments of the present disclosure further includes a non-temperature detection stage. In a preparation period P3 and a holding period P4 of the non-temperature detection stage, the sensing control circuitry 6 is further configured to control the data signal input end Data to be decoupled with the gate of the sensing transistor T0 under the control of the second control signal input end S2. In the preparation period P3, the compensation control circuitry 5 is further configured to control the adjustment voltage input end Ref to be decoupled with the second end of the second charge-discharge circuitry 4 under the control of the first control signal input end S1. In the holding period P4, the compensation control circuitry 5 is further configured to control the adjustment voltage input end Ref to be coupled to the second end of the second charge-discharge circuitry 4 under the control of the first control signal input end S1.

To be specific, in the preparation period P3 of the non-temperature detection stage, the oscillation circuitry 1 controls the signal output end Vout to output a high-level oscillation signal under a control of the first node N1. A power voltage Vdd is applied to the power signal input end ELVDD. The switch circuitry 2 controls, under a control of the high-level oscillation signal output by signal output end Vout, the power signal input end ELVDD to be coupled to the first node N1, to enable a level of the first node N1 to be the power voltage Vdd to charge the first charge-discharge circuitry 3. The sensing control circuitry 6 controls the data signal input end Data to be decoupled with the gate of the sensing transistor T0 under the control of the second control signal input end S2. The compensation control circuitry 5 controls the adjustment voltage input end Ref to be decoupled with the second end of the second charge-discharge circuitry 4 under a control of the first control signal input end S1.

In the holding period P4 of the non-temperature detection stage, the oscillation circuitry 1 controls the signal output end Vout to output a low-level oscillation signal under the control of the first node N1 (the current level of the first node N1 is Vdd). The switch circuitry 2 controls the power signal input end ELVDD to be decoupled with the first node N1, under the control of the low-level oscillation signal output by the signal output end Vout. Under a control of the first control signal input end, the sensing control circuitry 6 controls the data signal input end Data to be decoupled with the gate of the sensing transistor T0 to turn off the sensing transistor T0. A second adjustment voltage Vs is applied to the adjustment voltage input end Ref, where the second adjustment voltage Vs is a negative voltage. Under the control of the first control signal input end S1, the compensation control circuitry 5 controls the adjustment voltage input end Ref to be coupled to the second end of the second charge-discharge circuitry 4, to enable a level of the second end of the second charge-discharge circuitry 4 to be Vs. Under a bootstrap action of the second charge-discharge circuitry 4, the level of the first node N1 is changed from Vdd to Vdd+Vs. Under the control of the first node N1, the oscillation circuitry 1 controls the signal output end Vout to stop outputting.

According to the specific working process of the temperature sensor during the non-temperature detection stage, since the second adjustment voltage Vs is a negative voltage, the level of the first node N1 can be pulled down to a constant level Vdd+Vs during the non-temperature detection stage to make the oscillation circuitry 1 not to perform a self-oscillation, so that the oscillation circuitry 1 does not work in the non-temperature detection stage, thereby extending the service life of the device.

The oscillating circuitry 1, the switch circuitry 2, the first charge-discharge circuitry 3, the sensing transistor T0, the sensing control circuitry 6, the second charge-discharge circuitry 4, and a compensation control circuitry 5 of the above-mentioned temperature sensor all have various structures. A specific structure and corresponding connection relationship of each circuitry are described in the following, and the working process of the temperature sensor under a specific structure is described in detail.

Figure 7:
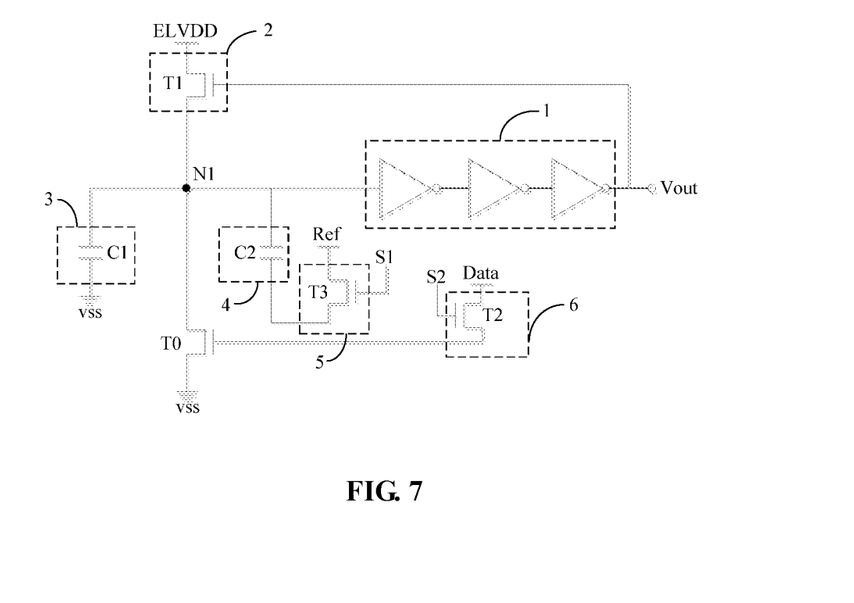
FIG. 7 is a schematic view of a temperature sensor in some embodiments of the present disclosure.

As shown in FIG. 7, the oscillation circuitry 1 may be an annular oscillator. The annular oscillator includes an odd number of inverters connected in series, and an input end of a first one of the inverters is coupled to the first node N1, and an output end of a last one of the inverters is coupled to the signal output end Vout.

The switch circuitry 2 includes a first switch transistor T1, a gate of the first switch transistor T1 is coupled to the signal output end Vout, a first electrode of the first switch transistor T1 is coupled to the power signal input end ELVDD, and a second electrode of the first switch T1 transistor is coupled to the first node N1.

The sensing control circuitry 6 includes a second switch transistor T2, a first electrode of the second switch transistor T2 is coupled to the data signal input end Data, a second electrode of the second switch transistor T2 is coupled to the gate of the sensing transistor T0, and a gate of the second switch transistor T2 is coupled to the second control signal input end S2.

The compensation control circuitry 5 includes a third switch transistor T3, a gate of the third switch transistor T3 is coupled to the first control signal input end S1, a first electrode of the third switch transistor T3 is coupled to the adjustment voltage input end Ref, and a second electrode of the third switch transistor T3 is coupled to the second end of the second charge-discharge circuitry 4.

The first charge-discharge circuitry 3 includes a first capacitor C1. A first end of the first capacitor C1 is coupled to the first node N1, and a second end of the first capacitor C1 is coupled to the low-level signal input end VSS.

The second charge-discharge circuitry 4 includes a second capacitor C2, a first end of the second capacitor C2 is coupled to the first node N1, and a second end of the second capacitor C2 is coupled to the compensation control circuitry 5.

To be specific, in the charging period P1 in at least one detection period of the temperature detection stage, the oscillation circuitry 1 controls the signal output end Vout to output a high-level oscillation signal under a control of the first node N1. A power voltage Vdd is applied to the power signal input end ELVDD. Under a control of the high-level oscillation signal output by signal output end Vout, the first switch transistor T1 is turned on, the power signal input end ELVDD is coupled to the first node N1, to enable a level of the first node N1 to be the power voltage Vdd to charge the first capacitor C1. Under the control of the second control signal input end S2, the second switch transistor T2 is turned off, and the data signal input end Data is decoupled with the gate of the sensing transistor T0. Under a control of the first control signal input end S1, the third switch transistor T3 is turned off, and the adjustment voltage input end Ref is decoupled with the second end of the second capacitor C2.

In a discharging period P2 in at least one detection period of the temperature detection stage, the annular oscillator controls the signal output end Vout to output a low-level oscillation signal under the control of the first node N1 (the current level of the first node N1 is Vdd). Under the control of the low-level oscillation signal output by the signal output end Vout, the first switch transistor T1 is turned off, and the power signal input end ELVDD is decoupled with the first node N1. A first adjustment voltage Vc is applied to the adjustment voltage input end Ref. Under a control of the first control signal input end S1, the third switch transistor T3 is turned on, the adjustment voltage input end Ref is coupled to the second end of the second capacitor C2, to enable a level of the second end of the second capacitor C2 to be Vc. Under a bootstrap action of the second capacitor C2, the level of the first node N1 is changed from Vdd to Vdd+Vc. A data voltage Vdata is applied to the data signal input end Data. Under a control of the first control signal input end, the second switch transistor T2 is turned on, the data signal input end Data is coupled to the sensing transistor T0, to enable a level of the gate of the sensing transistor T0 to be Vdata to turn on the sensing transistor T0, and enable the first capacitor C1 to discharge through the sensing transistor T0.

In the preparation period P3 of the non-temperature detection stage, the oscillation circuitry 1 controls the signal output end Vout to output a high-level oscillation signal under a control of the first node N1. A power voltage Vdd is applied to the power signal input end ELVDD. Under a control of the high-level oscillation signal output by signal output end Vout, the first switch transistor T1 is turned on, the power signal input end ELVDD is coupled to the first node N1, to enable a level of the first node N1 to be the power voltage Vdd to charge the first capacitor C1. Under the control of the second control signal input end S2, the second switch transistor T2 is turned off, the data signal input end Data is decoupled with the gate of the sensing transistor T0. Under a control of the first control signal input end S1, the third switch transistor T3 is turned off, the adjustment voltage input end Ref is decoupled with the second end of the second capacitor C2.

In the holding period P4 of the non-temperature detection stage, the annular oscillator controls the signal output end Vout to output a low-level oscillation signal under the control of the first node N1 (the current level of the first node N1 is Vdd). Under the control of the low-level oscillation signal output by the signal output end Vout, the first switch transistor T1 is turned off, the power signal input end ELVDD is decoupled with the first node N1. Under a control of the first control signal input end, the second switch transistor is turned off, the data signal input end Data is decoupled with the gate of the sensing transistor T0 to turn off the sensing transistor T0. A second adjustment voltage Vs is applied to the adjustment voltage input end Ref. Under the control of the first control signal input end S1, the third switch transistor T3 is turned on, the adjustment voltage input end Ref is coupled to the second end of the second capacitor C2, to enable a level of the second end of the second capacitor C2 to be Vs. Under a bootstrap action of the second capacitor C2, the level of the first node N1 is changed from Vdd to Vdd+Vs. Under the control of the first node N1, the annular oscillator controls the signal output end Vout to stop outputting.

It should be noted that, in the embodiments of the present disclosure, the sensing transistor T0 and each switch transistor are N-type transistors, and for example, the first electrode is a source, and the second electrode is a drain. The above sensing transistor T0 and each switch transistor may also be P-type transistors, and the circuitry design where the sensing transistor T0 and each switch transistor as a P-type transistor is also within the scope of the present disclosure.

In some embodiments of the present disclosure, the temperature sensor further includes a frequency detection circuitry coupled to the signal output end Vout. The frequency detection is configured to detect the oscillation frequency of the oscillation signal output by the signal output end Vout, so as to determine the temperature sensed by the temperature sensor.

A temperature detection method is further provided in some embodiments of the present disclosure, which is applied to the above temperature sensor. The method includes:

In a charging period P1 in at least one detection period of a temperature detection stage, the oscillation circuitry 1 controls the signal output end Vout to output a high-level oscillation signal under a control of the first node N1. A power voltage Vdd is applied to the power signal input end ELVDD. The switch circuitry 2 controls, under a control of the high-level oscillation signal output by signal output end Vout, the power signal input end ELVDD to be coupled to the first node N1, to enable a level of the first node N1 to be the power voltage Vdd to charge the first charge-discharge circuitry 3. The compensation control circuitry 5 controls the adjustment voltage input end Ref to be decoupled with the second end of the second charge-discharge circuitry 4 under a control of the first control signal input end S1. Under a control of the data signal input end Data, the sensing transistor T0 is turned off.

In a discharging period P2 in at least one detection period of the temperature detection stage, the oscillation circuitry 1 controls the signal output end Vout to output a low-level oscillation signal under the control of the first node N1 (the current level of the first node N1 is Vdd). The switch circuitry 2 controls the power signal input end ELVDD to be decoupled with the first node N1, under the control of the low-level oscillation signal output by the signal output end Vout. A first adjustment voltage Vc is applied to the adjustment voltage input end Ref. Under a control of the first control signal input end S1, the compensation control circuitry controls the adjustment voltage input end Ref to be coupled to the second end of the second charge-discharge circuitry 4, to enable a level of the second end of the second charge-discharge circuitry 4 to be Vc.

Under a bootstrap action of the second charge-discharge circuitry 4, the level of the first node N1 is changed from Vdd to Vdd+Vc, and Vc is equal to a threshold voltage Vth of the sensing transistor T0. A data voltage Vdata is applied to the data signal input end Data, to enable a level of the gate of the sensing transistor T0 to be Vdata to turn on the sensing transistor T0, and enable the first charge-discharge circuitry 3 to discharge through the sensing transistor T0.

According to the above temperature detection method, in the discharging period P2, when the sensing transistor T0 is turned on, the source-gate voltage Vsg of the sensing transistor T0 becomes (Vdd+Vth−Vdata), thereby making the sensing transistor to be turned on and generating a leakage current Id of k(Vdd−Vdata)$^2$, that is, the leakage current Id is only related to the data voltage Vdata and the power voltage Vdd, but is not related to the threshold voltage Vth of the sensing transistor T0. During the manufacturing process of the temperature sensor, even if the threshold voltage of the sensing transistor T0 of the temperature sensor is shifted due to the manufacturing process and environmental factors, the leakage current Id generated when the sensing transistor T0 operates in the saturation state may not be affected, therefore the frequency of the signal output by the temperature sensor may not be affected by the threshold voltage Vth of the sensing transistor T0, thereby ensuring the accuracy of the temperature measurement result.

When the temperature sensor includes the sensing control circuitry 6, in the charging period P1 in at least one detection period of the temperature detection stage, under the control of the second control signal end S2, the sensing control circuitry 6 controls the data signal input end Data to be decoupled with the gate of the sensing transistor T0, and the sensing transistor T0 is turned off. In the discharging period P2 in at least one detection period of the temperature detection stage, under the control of the second control signal end S2, the sensing control circuitry 6 controls the data signal input end Data to be coupled to the gate of the sensing transistor T0, so as to enable the level of the gate of the sensing transistor T0 to be Vdata.

In some embodiments of the present disclosure, the temperature detection method further includes:

In the preparation period P3 of the non-temperature detection stage, the oscillation circuitry 1 controls the signal output end Vout to output a high-level oscillation signal under a control of the first node N1. A power voltage Vdd is applied to the power signal input end ELVDD. The switch circuitry 2 controls, under a control of the high-level oscillation signal output by signal output end Vout, the power signal input end ELVDD to be coupled to the first node N1, to enable a level of the first node N1 to be the power voltage Vdd to charge the first charge-discharge circuitry 3. The sensing control circuitry 6 controls the data signal input end Data to be decoupled with the gate of the sensing transistor T0 under the control of the second control signal input end S2. The compensation control circuitry 5 controls the adjustment voltage input end Ref to be decoupled with the second end of the second charge-discharge circuitry 4 under a control of the first control signal input end S1.

In the holding period P4 of the non-temperature detection stage, the oscillation circuitry 1 controls the signal output end Vout to output a low-level oscillation signal under the control of the first node N1 (the current level of the first node N1 is Vdd). The switch circuitry 2 controls the power signal input end ELVDD to be decoupled with the first node N1, under the control of the low-level oscillation signal output by the signal output end Vout. Under a control of the first control signal input end, the sensing control circuitry 6 controls the data signal input end Data to be decoupled with the gate of the sensing transistor T0 to turn off the sensing transistor T0. A second adjustment voltage Vs is applied to the adjustment voltage input end Ref, where the second adjustment voltage Vs is a negative voltage. Under the control of the first control signal input end S1, the compensation control circuitry 5 controls the adjustment voltage input end Ref to be coupled to the second end of the second charge-discharge circuitry 4, to enable a level of the second end of the second charge-discharge circuitry 4 to be Vs. Under a bootstrap action of the second charge-discharge circuitry 4, the level of the first node N1 is changed from Vdd to Vdd+Vs. Under the control of the first node N1, the oscillation circuitry 1 controls the signal output end Vout to stop outputting.

It should be noted that, the terms "coupled to" in the present disclosure refers to a direct coupling and an indirect coupling via other elements.

Although the embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

The above are merely some embodiments of the present disclosure. A person skilled in the art may make further modifications and improvements without departing from the principle of the present disclosure, and these modifications and improvements shall also fall within the scope of the present disclosure.

What is claimed is:

1. A temperature sensor, comprising:
an oscillation circuitry, coupled to a first node and a signal output end, and configured to control the signal output end to output an oscillation signal under a control of the first node;
a switch circuitry, coupled to a power signal input end, the first node and the signal output end, and configured to control the power signal input end to be coupled to or decoupled with the first node under a control of the signal output end;
a first charge-discharge circuitry, coupled to the first node and a low-level signal input end, configured to charge or discharge under the control of the first node;
a sensing transistor, wherein a first electrode of the sensing transistor is coupled to the first node, a second electrode of the sensing transistor is coupled to the low-level signal input end, and a gate of the sensing transistor is coupled to a data signal input end;
a second charge-discharge circuitry, wherein a first end of the second charge-discharge circuitry is coupled to the first node; and
a compensation control circuitry, coupled to a second end of the second charge-discharge circuitry, an adjustment voltage input end and a first control signal input end, and configured to:
control the adjustment voltage input end to be decoupled with the second end of the second charge-discharge circuitry under a control of the first control signal input end in a charging period of a temperature detection stage;
control the adjustment voltage input end to be coupled to the second end of the second charge-discharge circuitry under the control of the first control signal input end in a discharging period of the temperature detection stage;
wherein the temperature sensor further comprises: a sensing control circuitry, wherein the gate of the sensing transistor is coupled to the data signal input end through the sensing control circuitry;
the sensing control circuitry is coupled to a second control signal input end, and configured to:
control the data signal input end to be decoupled with the gate of the sensing transistor under a control of the second control signal input end in the charging period of the temperature detection stage, to turn off the sensing transistor;

control the data signal input end to be coupled with the gate of the sensing transistor under the control of the second control signal input end in the discharging period of the temperature detection stage, to enable a level of the gate of the sensing transistor to be a data voltage output by the data signal input end, to turn on the sensing transistor, and enable the first charge-discharge circuitry to discharge through the sensing transistor.

2. The temperature sensor according to claim 1, wherein the sensing control circuitry is further configured to control the data signal input end to be decoupled with the gate of the sensing transistor under the control of the second control signal input end in a preparation period and a holding period of a non-temperature detection stage;

the compensation control circuitry is further configured to:

control the adjustment voltage input end to be decoupled with the second end of the second charge-discharge circuitry under the control of the first control signal input end in the preparation period of the non-temperature detection stage;

control the adjustment voltage input end to be coupled to the second end of the second charge-discharge circuitry under the control of the first control signal input end in the holding period of the non-temperature detection stage.

3. A temperature detection method, applied to the temperature sensor according to claim 2, wherein the method comprises:

in a charging period in at least one detection period of a temperature detection stage, under a control of the first node, controlling, by the oscillation circuitry, the signal output end to output a high-level oscillation signal;

applying a power voltage to the power signal input end;

under a control of the signal output end, controlling, by the switch circuitry, the power signal input end to be coupled to the first node, to enable a level of the first node to be the power voltage to charge the first charge-discharge circuitry;

in a discharging period in at least one detection period of the temperature detection stage, under the control of the first node, controlling, by the oscillation circuitry, the signal output end to output a low-level oscillation signal;

under the control of the signal output end, controlling, by the switch circuitry, the power signal input end to be decoupled with the first node;

applying a first adjustment voltage to the adjustment voltage input end;

under a control of the first control signal input end, controlling, by the compensation control circuitry, the adjustment voltage input end to be coupled to the second end of the second charge-discharge circuitry, to enable a level of the second end of the second charge-discharge circuitry to be the first adjustment voltage, wherein under a bootstrap action of the second charge-discharge circuitry, the level of the first node is changed from the power voltage to a sum of the power voltage and the first adjustment voltage, and the first adjustment voltage is equal to a threshold voltage of the sensing transistor;

applying a data voltage to the data signal input end, to enable a level of the gate of the sensing transistor to be the data voltage to turn on the sensing transistor, and enable the first charge-discharge circuitry to discharge through the sensing transistor.

4. The temperature sensor according to claim 1, wherein the oscillation circuitry comprises an odd number of inverters connected in series, and an input end of a first one of the inverters is coupled to the first node, and an output end of a last one of the inverters is coupled to the signal output end.

5. A temperature detection method, applied to the temperature sensor according to claim 4, wherein the method comprises:

in a charging period in at least one detection period of a temperature detection stage, under a control of the first node, controlling, by the oscillation circuitry, the signal output end to output a high-level oscillation signal;

applying a power voltage to the power signal input end;

under a control of the signal output end, controlling, by the switch circuitry, the power signal input end to be coupled to the first node, to enable a level of the first node to be the power voltage to charge the first charge-discharge circuitry;

in a discharging period in at least one detection period of the temperature detection stage, under the control of the first node, controlling, by the oscillation circuitry, the signal output end to output a low-level oscillation signal;

under the control of the signal output end, controlling, by the switch circuitry, the power signal input end to be decoupled with the first node;

applying a first adjustment voltage to the adjustment voltage input end;

under a control of the first control signal input end, controlling, by the compensation control circuitry, the adjustment voltage input end to be coupled to the second end of the second charge-discharge circuitry, to enable a level of the second end of the second charge-discharge circuitry to be the first adjustment voltage, wherein under a bootstrap action of the second charge-discharge circuitry, the level of the first node is changed from the power voltage to a sum of the power voltage and the first adjustment voltage, and the first adjustment voltage is equal to a threshold voltage of the sensing transistor;

applying a data voltage to the data signal input end, to enable a level of the gate of the sensing transistor to be the data voltage to turn on the sensing transistor, and enable the first charge-discharge circuitry to discharge through the sensing transistor.

6. The temperature sensor according to claim 1, wherein the switch circuitry comprises a first switch transistor, a gate of the first switch transistor is coupled to the signal output end, a first electrode of the first switch transistor is coupled to the power signal input end, and a second electrode of the first switch transistor is coupled to the first node.

7. A temperature detection method, applied to the temperature sensor according to claim 6, wherein the method comprises:

in a charging period in at least one detection period of a temperature detection stage, under a control of the first node, controlling, by the oscillation circuitry, the signal output end to output a high-level oscillation signal;

applying a power voltage to the power signal input end;

under a control of the signal output end, controlling, by the switch circuitry, the power signal input end to be coupled to the first node, to enable a level of the first node to be the power voltage to charge the first charge-discharge circuitry;

in a discharging period in at least one detection period of the temperature detection stage, under the control of the first node, controlling, by the oscillation circuitry, the signal output end to output a low-level oscillation signal;

under the control of the signal output end, controlling, by the switch circuitry, the power signal input end to be decoupled with the first node;

applying a first adjustment voltage to the adjustment voltage input end;

under a control of the first control signal input end, controlling, by the compensation control circuitry, the adjustment voltage input end to be coupled to the second end of the second charge-discharge circuitry, to enable a level of the second end of the second charge-discharge circuitry to be the first adjustment voltage, wherein under a bootstrap action of the second charge-discharge circuitry, the level of the first node is changed from the power voltage to a sum of the power voltage and the first adjustment voltage, and the first adjustment voltage is equal to a threshold voltage of the sensing transistor;

applying a data voltage to the data signal input end, to enable a level of the gate of the sensing transistor to be the data voltage to turn on the sensing transistor, and enable the first charge-discharge circuitry to discharge through the sensing transistor.

8. The temperature sensor according to claim 1, wherein the sensing control circuitry comprises a second switch transistor, a first electrode of the second switch transistor is coupled to the data signal input end, a second electrode of the second switch transistor is coupled to the gate of the sensing transistor, and a gate of the second switch transistor is coupled to the second control signal input end.

9. A temperature detection method, applied to the temperature sensor according to claim 8, wherein the method comprises:

in a charging period in at least one detection period of a temperature detection stage, under a control of the first node, controlling, by the oscillation circuitry, the signal output end to output a high-level oscillation signal;

applying a power voltage to the power signal input end;

under a control of the signal output end, controlling, by the switch circuitry, the power signal input end to be coupled to the first node, to enable a level of the first node to be the power voltage to charge the first charge-discharge circuitry;

in a discharging period in at least one detection period of the temperature detection stage, under the control of the first node, controlling, by the oscillation circuitry, the signal output end to output a low-level oscillation signal;

under the control of the signal output end, controlling, by the switch circuitry, the power signal input end to be decoupled with the first node;

applying a first adjustment voltage to the adjustment voltage input end;

under a control of the first control signal input end, controlling, by the compensation control circuitry, the adjustment voltage input end to be coupled to the second end of the second charge-discharge circuitry, to enable a level of the second end of the second charge-discharge circuitry to be the first adjustment voltage, wherein under a bootstrap action of the second charge-discharge circuitry, the level of the first node is changed from the power voltage to a sum of the power voltage and the first adjustment voltage, and the first adjustment voltage is equal to a threshold voltage of the sensing transistor;

applying a data voltage to the data signal input end, to enable a level of the gate of the sensing transistor to be the data voltage to turn on the sensing transistor, and enable the first charge-discharge circuitry to discharge through the sensing transistor.

10. The temperature sensor according to claim 1, wherein the compensation control circuitry comprises a third switch transistor, a gate of the third switch transistor is coupled to the first control signal input end, a first electrode of the third switch transistor is coupled to the adjustment voltage input end, and a second electrode of the third switch transistor is coupled to the second end of the second charge-discharge circuitry.

11. A temperature detection method, applied to the temperature sensor according to claim 10, wherein the method comprises:

in a charging period in at least one detection period of a temperature detection stage, under a control of the first node, controlling, by the oscillation circuitry, the signal output end to output a high-level oscillation signal;

applying a power voltage to the power signal input end;

under a control of the signal output end, controlling, by the switch circuitry, the power signal input end to be coupled to the first node, to enable a level of the first node to be the power voltage to charge the first charge-discharge circuitry;

in a discharging period in at least one detection period of the temperature detection stage, under the control of the first node, controlling, by the oscillation circuitry, the signal output end to output a low-level oscillation signal;

under the control of the signal output end, controlling, by the switch circuitry, the power signal input end to be decoupled with the first node;

applying a first adjustment voltage to the adjustment voltage input end;

under a control of the first control signal input end, controlling, by the compensation control circuitry, the adjustment voltage input end to be coupled to the second end of the second charge-discharge circuitry, to enable a level of the second end of the second charge-discharge circuitry to be the first adjustment voltage, wherein under a bootstrap action of the second charge-discharge circuitry, the level of the first node is changed from the power voltage to a sum of the power voltage and the first adjustment voltage, and the first adjustment voltage is equal to a threshold voltage of the sensing transistor;

applying a data voltage to the data signal input end, to enable a level of the gate of the sensing transistor to be the data voltage to turn on the sensing transistor, and enable the first charge-discharge circuitry to discharge through the sensing transistor.

12. A temperature detection method, applied to the temperature sensor according to claim 1, wherein the method comprises:

in a charging period in at least one detection period of a temperature detection stage, under a control of the first node, controlling, by the oscillation circuitry, the signal output end to output a high-level oscillation signal;

applying a power voltage to the power signal input end;

under a control of the signal output end, controlling, by
the switch circuitry, the power signal input end to be
coupled to the first node, to enable a level of the first
node to be the power voltage to charge the first charge-
discharge circuitry;
in a discharging period in at least one detection period of
the temperature detection stage,
under the control of the first node, controlling, by the
oscillation circuitry, the signal output end to output a
low-level oscillation signal;
under the control of the signal output end, controlling, by
the switch circuitry, the power signal input end to be
decoupled with the first node;
applying a first adjustment voltage to the adjustment
voltage input end;
under a control of the first control signal input end,
controlling, by the compensation control circuitry, the
adjustment voltage input end to be coupled to the
second end of the second charge-discharge circuitry, to
enable a level of the second end of the second charge-
discharge circuitry to be the first adjustment voltage,
wherein under a bootstrap action of the second charge-
discharge circuitry, the level of the first node is changed
from the power voltage to a sum of the power voltage
and the first adjustment voltage, and the first adjust-
ment voltage is equal to a threshold voltage of the
sensing transistor;
applying a data voltage to the data signal input end, to
enable a level of the gate of the sensing transistor to be
the data voltage to turn on the sensing transistor, and
enable the first charge-discharge circuitry to discharge
through the sensing transistor.

13. The temperature detection method according to claim
12, wherein in the case that the temperature sensor com-
prises the sensing control circuitry, the sensing control
circuitry controls the data signal input end to be decoupled
with the gate of the sensing transistor under a control of the
second control signal input end in the charging period in at
least one detection period of the temperature detection stage,
and the sensing control circuitry controls the data signal
input end to be coupled to the gate of the sensing transistor
under the control of the second control signal input end in
the discharging period in at least one detection period of the
temperature detection stage, to enable the level of the gate
of the sensing transistor to be the data voltage.

14. The temperature detection method according to claim
13, further comprising:
in the preparation period of the non-temperature detection
stage,
under the control of the first node, controlling, by the
oscillation circuitry, the signal output end to output a
high-level oscillation signal;
applying a power voltage to the power signal input end;
under a control of the signal output end, controlling, by
the switch circuitry, the power signal input end to be
coupled to the first node, to enable a level of the first
node to be the power voltage to charge the first charge-
discharge circuitry;
in the holding period of the non-temperature detection
stage,
under a control of the first control signal input end,
controlling, by the sensing control circuitry, the data
signal input end to be decoupled with the gate of the
sensing transistor to turn off the sensing transistor;
applying a second adjustment voltage to the adjustment
voltage input end, wherein the second adjustment volt-
age is a negative voltage;

under the control of the first control signal input end,
controlling, by the compensation control circuitry, the
adjustment voltage input end to be coupled to the
second end of the second charge-discharge circuitry, to
enable a level of the second end of the second charge-
discharge circuitry to be the second adjustment voltage,
wherein under a bootstrap action of the second charge-
discharge circuitry, the level of the first node is changed
from the power voltage to a sum of the power voltage
and the second adjustment voltage; and
under the control of the first node, controlling, by the
oscillation circuitry, the signal output end to stop out-
putting.

15. A temperature detection method, applied to a tem-
perature sensor comprising:
an oscillation circuitry, coupled to a first node and a signal
output end, and configured to control the signal output
end to output an oscillation signal under a control of the
first node;
a switch circuitry, coupled to a power signal input end, the
first node and the signal output end, and configured to
control the power signal input end to be coupled to or
decoupled with the first node under a control of the
signal output end;
a first charge-discharge circuitry, coupled to the first node
and a low-level signal input end, configured to charge
or discharge under the control of the first node;
a sensing transistor, wherein a first electrode of the
sensing transistor is coupled to the first node, a second
electrode of the sensing transistor is coupled to the
low-level signal input end, and a gate of the sensing
transistor is coupled to a data signal input end;
a second charge-discharge circuitry, wherein a first end of
the second charge-discharge circuitry is coupled to the
first node; and
a compensation control circuitry, coupled to a second end
of the second charge-discharge circuitry, an adjustment
voltage input end and a first control signal input end,
and configured to:
control the adjustment voltage input end to be decoupled
with the second end of the second charge-discharge
circuitry under a control of the first control signal input
end in a charging period of a temperature detection
stage;
control the adjustment voltage input end to be coupled to
the second end of the second charge-discharge circuitry
under the control of the first control signal input end in
a discharging period of the temperature detection stage;
wherein the method comprises:
in a charging period in at least one detection period of a
temperature detection stage, under a control of the first
node, controlling, by the oscillation circuitry, the signal
output end to output a high-level oscillation signal;
applying a power voltage to the power signal input end;
under a control of the signal output end, controlling, by
the switch circuitry, the power signal input end to be
coupled to the first node, to enable a level of the first
node to be the power voltage to charge the first charge-
discharge circuitry;
in a discharging period in at least one detection period of
the temperature detection stage,
under the control of the first node, controlling, by the
oscillation circuitry, the signal output end to output a
low-level oscillation signal;
under the control of the signal output end, controlling, by
the switch circuitry, the power signal input end to be
decoupled with the first node;

applying a first adjustment voltage to the adjustment voltage input end;

under a control of the first control signal input end, controlling, by the compensation control circuitry, the adjustment voltage input end to be coupled to the second end of the second charge-discharge circuitry, to enable a level of the second end of the second charge-discharge circuitry to be the first adjustment voltage, wherein under a bootstrap action of the second charge-discharge circuitry, the level of the first node is changed from the power voltage to a sum of the power voltage and the first adjustment voltage, and the first adjustment voltage is equal to a threshold voltage of the sensing transistor;

applying a data voltage to the data signal input end, to enable a level of the gate of the sensing transistor to be the data voltage to turn on the sensing transistor, and enable the first charge-discharge circuitry to discharge through the sensing transistor.

\* \* \* \* \*